(12) United States Patent
Stuber et al.

(10) Patent No.: US 6,725,306 B2
(45) Date of Patent: Apr. 20, 2004

(54) DEBUG MODE FOR A DATA BUS

(75) Inventors: Russell B. Stuber, Boulder, CO (US);
Robert W. Moss, Longmont, CO (US);
David O. Sluiter, Superior, CO (US)

(73) Assignee: LSI Logic Corporation, Milpitas, CA (US)

( * ) Notice: Subject to any disclaimer, the term of this patent is extended or adjusted under 35 U.S.C. 154(b) by 193 days.

(21) Appl. No.: 10/083,833

(22) Filed: Feb. 27, 2002

(65) Prior Publication Data

US 2003/0163613 A1 Aug. 28, 2003

(51) Int. Cl.[7] .............................................. G06F 13/38
(52) U.S. Cl. ........................ 710/107; 710/108; 710/110; 710/112; 710/57
(58) Field of Search .......................... 710/15, 19, 39, 710/57, 107, 108, 110, 112, 306, 310

(56) References Cited

U.S. PATENT DOCUMENTS

| | | | | |
|---|---|---|---|---|
| 5,535,340 A | * | 7/1996 | Bell et al. .................... | 710/112 |
| 5,682,554 A | * | 10/1997 | Harrell ......................... | 710/57 |
| 6,115,768 A | * | 9/2000 | Yamamoto .................. | 710/107 |
| 2002/0052999 A1 | * | 5/2002 | Jahnke et al. ............... | 710/306 |
| 2002/0059511 A1 | * | 5/2002 | Sudo et al. .................. | 712/207 |

OTHER PUBLICATIONS

"AMBA™ Specification (Rev. 2.0)" for ARM Limited 1999, *Advanced Microcontroller Bus Architecture (AMBA)* ARM IHI 0011A, May 13, 1999, pp. 3-1 through 3-58.

* cited by examiner

*Primary Examiner*—Ilwoo Park
(74) *Attorney, Agent, or Firm*—Westman, Champlin & Kelly

(57) ABSTRACT

A slave device includes a queue that receives commands or data from a master device for execution on a first-in, first-out basis. A status register is responsive to the queue to provide a STATUS_FULL signal when the queue is full of commands and a STATUS_EMPTY signal when the queue is empty. A configuration register provides a DEBUG signal identifying a maintenance status of the slave device. A bus control provides a QUEUE_FULL signal in response to either (1) the STATUS_FULL signal or (2) the DEBUG signal and not the STATUS_EMPTY signal to split further commands or stall the data bus.

20 Claims, 2 Drawing Sheets

DEBUG MODE FOR A DATA BUS

FIELD OF THE INVENTION

This invention relates to data buses, and particularly to controls for data buses used in integrated circuit chips and the like.

BACKGROUND OF THE INVENTION

Data buses are used in integrated circuits (ICs) to transfer data between termination points established by the IC. Usually, one or more of the termination points is coupled to a master device, such as a user-controlled microprocessor, and other termination points are coupled to one or more slave devices that control peripheral devices, such as a memory or the like. To avoid overlapping data messages that may lead to error in data transmission between the master and slave devices, it is common to employ an arbiter to arbitrate transmission of messages on the bus. One such bus design is an Advanced High-performance Bus (AHB) from ARM Limited of Cambridge, England. The AHB bus design is a form of an Advanced Microcontroller Bus Architecture (AMBA) bus. The AHB bus provides high performance, high clock frequency transfer between multiple bus master devices and multiple bus slave devices through use of an arbiter. The AHB bus is particularly useful in integrated circuit chips, including single chip processors, to couple processors to on-chip memories and off-chip external memory interfaces.

The slave devices ordinarily operate external peripheral devices through device controllers. In most cases, commands are fed to the device controller by a command queue, which is a first-in, first-out (FIFO) register. The device controller pulls commands from the FIFO as the commands become available. The device controller often operates at a slower speed than the bus. Consequently, it is possible that the FIFO becomes filled with several commands.

One problem of many bus designs, including the AHB bus, is that it is not altogether possible to accurately follow a transaction over the bus, through the FIFO and to the device controller for maintenance or analysis (debugging) purposes. More particularly, where the bus runs at a speed faster than that of the device controller, the FIFO acts as a buffer containing several unexecuted commands in a queue. A maintenance command sent over the bus for analysis purposes might be delayed until commands ahead of it in the queue are processed by the device controller. Consequently a significant delay in the transaction may occur between issuing the maintenance command onto the bus and pulling the command up from the FIFO by the device controller.

To overcome this problem, it has been common to operate a single master device to issue one command at a time for analysis of the bus. This technique necessitated disabling all competing master devices from the bus. However, this technique did not accurately simulate operation of the bus. More particularly, an operating bus system employs several master devices that compete for use of the bus and for access to a slave device and its peripheral device. If all but one of the competing master devices is disabled, arbitration of access to the competing master devices cannot be analyzed.

SUMMARY OF THE INVENTION

The present invention is directed to a debug technique that slows operation of the slave unit so that a transaction on the bus can be easily traced for maintenance and analysis purposes without disabling competing master devices.

In one embodiment, the slave device receives commands from a master device and places them in a queue for execution on a first-in, first-out basis. A status register is responsive to the command queue to provide a first command signal when the command queue is full of commands and a second command signal when the command queue is not empty. A configuration register provides a DEBUG signal identifying a maintenance status of the slave device. A bus control is responsive to the DEBUG and the first and second status signals to provide a queue full signal in response to either (1) the first status signal or (2) both the DEBUG and the second status signals to operate the data bus to a predetermined mode. In preferred embodiments, the predetermined mode is either a split mode that denies a requesting master device access to the data bus and idles the bus, or a stall mode that stalls the bus. Maintenance commands are processed through the data bus and slave device one at a time to permit analysis of the performance of the system.

In another embodiment the status register identifies whether the data FIFO is full and not empty and the bus control operates the data bus to the predetermined mode when the data FIFO is full or in response to the DEBUG mode when the data FIFO is not empty.

In yet other embodiments, the status of both the command queue and the data FIFO is employed to operate the bus control.

DETAILED DESCRIPTION OF THE PREFERRED EMBODIMENTS

Figure 1:
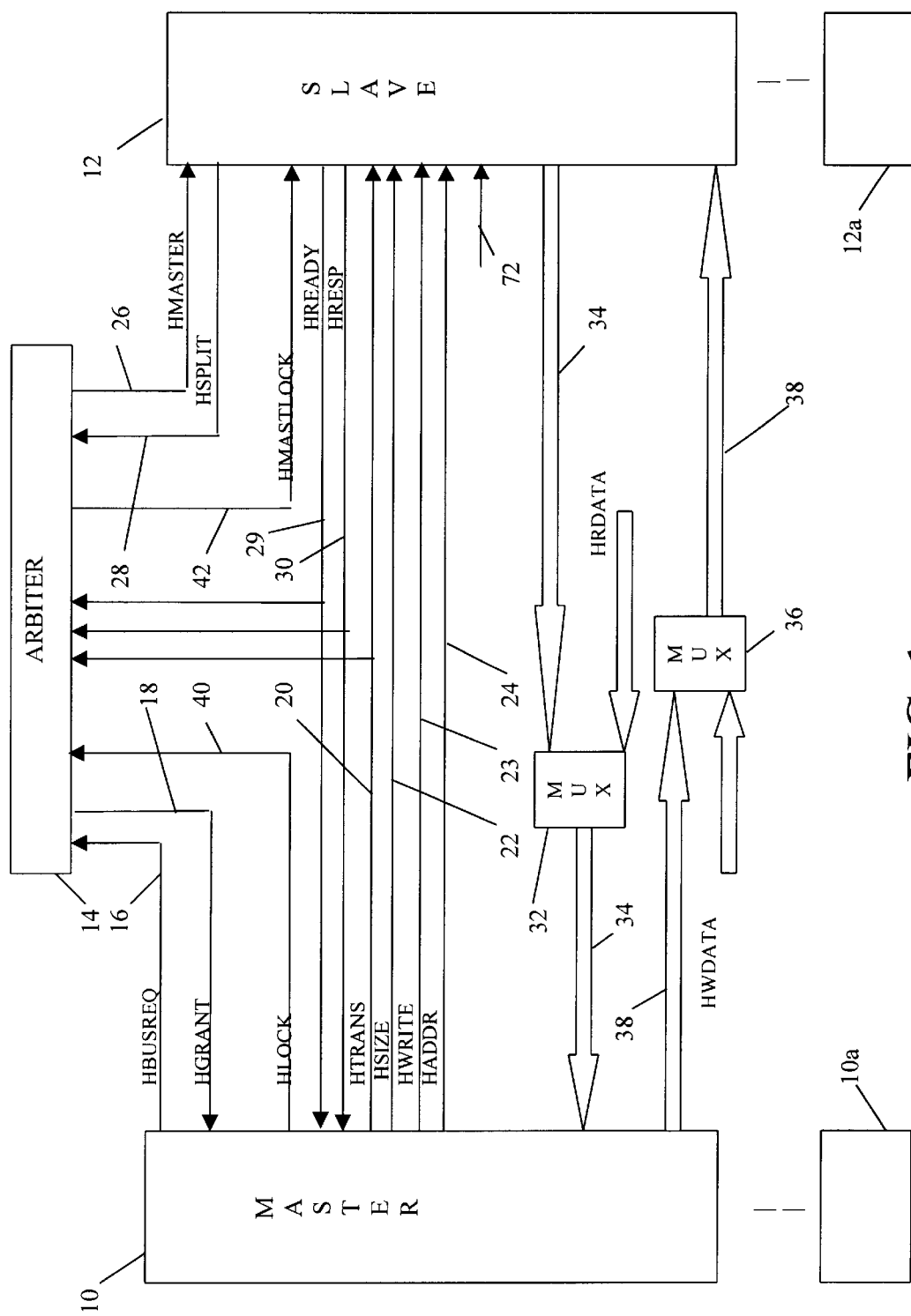
FIG. 1 is a block diagram of portions of a bus, illustrating a maintenance control according to the present invention.

FIG. 1 illustrates portions of an Advanced High-performance Bus (AHB) design of an Advanced Microcontroller Bus Architecture (AMBA) bus from ARM Limited of Cambridge, England containing features of the present invention. A more detailed description of the AHB bus design may be found in AMBA Specification published by ARM Limited of Cambridge, England (1999), and particularly Chapter 3 thereof (pp. 3–1 to 3–58), incorporated herein by reference. This bus provides high performance, high clock frequency transfer between multiple bus master devices 10, 10a, etc. and multiple bus slave devices 12, 12a, etc., and is particularly useful in microprocessor chips, including single chip processors.

A master device 10 is a device that is capable of initiating a data transfer with a slave device 12 by providing address and control information. Examples of operations requiring data transfer between master and slave devices include read and write operations to read data from, or write data to, a peripheral memory device operated by the slave device. A slave device 12 is a device that responds to a command to perform the data transfer. The slave device ordinarily provides a return indicating the success, failure or waiting status of the data transfer.

In the bus illustrated in FIG. 1, data transfer operations between the master and slave devices are arbitrated by an arbiter 14, which is a device that ensures that only one master device 10 is allowed to initiate data transfers at a given time. The arbiter operates in accordance with an arbitration protocol that establishes a priority among the master devices, such as by an assigned rank or an allocation scheme based on usage.

One feature of the bus illustrated in FIG. 1 is the ability of certain slave devices 12 to initiate a split of a transfer request from a master device 10. More particularly, when a slave device is not ready to respond to the master device command, it may issue a stall or a split. A stall will hold the bus for the transaction with the master device so that no other traffic is permitted. A split will block the master device from the bus and idle the bus so that it becomes available to other master devices. Thus, a stall holds the bus busy, whereas a split releases the bus for use by other master devices. Splits are issued in response to implementation-specific conditions, such as where the slave device decides that the transfer will require a large number of cycles to complete or where the slave device is unable to process multiple transfer requests concurrently.

If the slave device issues a split, the requesting master device is blocked from use of the bus and the bus is idled for use by other master devices. When the slave device becomes ready to handle a request from a master device, it releases the split so that the previously-split master device can be granted access to the bus.

Split transfers improve the overall utilization of the bus by separating, or splitting, the operation of the master device 10 providing the address to a slave device 12 from the operation of the slave device. Thus, with a split operation, the slave device can delay a master device from access to the bus until the slave device is ready to respond to the command.

A split initiated by slave device 12 causes arbiter 14 to mask off the master device 10 which issued the command from access to the bus. The split also idles the bus for use by other master devices. When slave device 12 is ready to handle the master device request, it notifies arbiter 14 that it is ready and the arbiter unmasks the affected master device 10 so that the master device can be granted access to the bus in accordance with the arbitration protocol of the arbiter. Upon re-arbitration and re-grant, the master device re-issues the command that had been split to the slave device.

In operation of the data bus system shown in FIG. 1, arbiter 14 is configured to receive an HBUSREQ signal via an individual line 16 from a respective master device 10, indicating that the respective master device 10 seeks access to the data bus. Arbiter 14 responds to the requests in an order established by its protocol, as modified by any split or retry operation, to issue an HGRANT signal via a respective line 18 to one of the requesting master devices. If, for example, there are sixteen master devices, there will be sixteen lines 16 on which each respective master device 10 notifies arbiter 14 that the respective master device desires use of the bus and there will be sixteen lines 18 on which access is granted. The arbiter protocol grants access to one and only one master device at a time.

When access is granted to a master device 10, the address phase commences with the requesting master device 10 sending each slave device 12 an HTRANS signal via bus 20, an HSIZE signal via bus 22, an HWRITE signal via bus 23 and an HADDR signal via bus 24. The HTRANS signal is also sent to arbiter 14. In addition, the master device sends an HLOCK signal to the arbiter. The HWRITE signal is a single bit representing whether the master device is requesting a read or a write operation; the HSIZE signal is a 3-bit code representing the size of the transfer; the HADDR signal is a 32-bit code representing the address of the location in a slave device where data are to be read or written; the HTRANS signal is a 2-bit code identifying the type of transfer (e.g., sequential, non-sequential, idle or busy); and the HLOCK signal is a bit indicating whether or not the master is performing a series of indivisible (locked) transactions.

Arbiter 14 asserts a master identification code, or tag, via bus 26 identifying the master device that is using the bus. This tag is sent to all of the slave devices via bus 26. In the case of a system with sixteen master devices, the master identification code is a 4-bit code representing the individual master device. Arbiter 14 also asserts an HMASTLOCK bit indicating that the transfer is or is not part of a locked transaction.

Each master transaction (HTRANS) on bus 20 generates a response from one of the slave devices 12, namely the slave device containing the address where the data are to be read or written. The response appears on buses 29 and 30 as a 1-bit HREADY signal and a 2-bit HRESP signal. For purposes of the present invention, there are three responses that need to be considered (there are others as more fully described in the aforementioned AMBA Specification). An OKAY response occurs when HRESP is OKAY (HRESP=(0,0) and HREADY is asserted (HREADY=1). A STALL response occurs when HRESP is OKAY and HREADY is de-asserted (HRESP=(0,0) and HREADY=0). A SPLIT response is a two-cycle response that during the first cycle HRESP is SPLIT (HRESP=(1,1)) and HREADY is de-asserted (HREADY=0) and during the second cycle HRESP remains SPLIT and HREADY is asserted (HRESP=(1,1) and HREADY=1).

The OKAY response (HRESP=(0,0) and HREADY=1) indicates that the previous command has been completed. For example, that the write command and data transfer was accepted by the slave device or that read data are available on the HRDATA bus 34. The STALL response (HRESP=(00) and HREADY=0) indicates that the slave device is not ready to provide a response. The slave device may hold HREADY low (HREADY=0) as long as it desires, but arbiter 14 cannot permit any bus traffic as long as HREADY is low, and the results of the prior transfer may not be known. The first cycle of the SPLIT response (HRESP=(1,1) and HREADY=0) causes arbiter 14 to mask off the master device from use of the bus, and the second cycle of the SPLIT response (HRESP=(1,1) and HREADY=1) idles the bus for use by other master devices.

Upon receipt of a command from a master device, the slave device records the bus master number in a master ID queue. If the slave device decides it will handle the transaction it issues an OKAY response on HRESP bus 30. If the command is a write command, or if it is a read command and the read data are available on HRDATA bus 34, the slave device also asserts a bit on the HREADY bus 29 (HREADY=1) and the transaction is completed. Otherwise, the slave device de-asserts the HREADY bus 30 (HREADY=0) to STALL the bus. When read data become available on HRDATA bus 34, slave device 12 asserts a bit on HREADY bus 29 and the transaction is completed.

If the slave device decides it is not ready to handle the transaction, it issues a SPLIT response on HREADY bus 30 and HRESP bus 29 to mask the master device from the bus and idle the bus. Later, when the slave device becomes free to accept a command, it asserts a bit on HSPLIT bus 28 to unmask the split master device(s). More particularly, bus 28 comprises the same number of lines as there are master devices 10, with one line dedicated for each master device. When slave device 12 is ready to accept a command, it asserts a bit on each HSPLIT line 28 corresponding to master devices 10 that it had split, thereby unmasking those master devices so that they may access the bus. Arbiter 14 eventually re-arbitrates the previously masked master devices in accordance with its protocol. On re-arbitration, the master device will eventually be granted access to the bus to re-issue the command and retry the transfer.

The basic stages of a split transaction of a read operation are as follows:

1. The master device 10 starts the transfer in an identical way to any other transfer and issues address and control information.
2. If the slave device 12 is able to provide data immediately it may do so. If the slave device decides that it may take a number of cycles to obtain the data or otherwise honor the command, it may give a split response via buses 29 and 30. During every transfer arbiter 14 broadcasts a number, or tag, showing which master device 10 is using the bus. The slave device 12 that can perform the command records the number, to use it to restart the transfer at a later time.
3. The arbiter masks off the split master device and arbitrates the other master devices for use of the bus. The action of the split response allows bus master device handover to occur.
4. When the slave device 12 is ready to complete the transfer, it asserts a bit on the appropriate line of HSPLIT bus 28 to the arbiter 14 to indicate which master device 10 should be re-arbitrated access to the bus.
5. When the bit is asserted on HSPLIT bus 28, arbiter 14 restores the priority of that master device.
6. Eventually, the arbiter will grant the master device use of the bus so it can re-issue the command and re-attempt the transfer. This may not occur immediately if a higher priority master is using the bus.
7. When the transfer eventually takes place, the slave finishes with an OKAY response (HRESP=(0,0) and HREADY=1) via buses 29 and 30.

As shown in FIG. 1, actual transfer of data is performed directly between the slave device 12 and master device 10. A read transfer occurs when the slave device receives the master identification tag via bus 26 for the master device 10 for which it has retrieved data. At that time, the correct master device 10 has been granted access to the bus and the transfer takes place through multiplexer 32 on bus 34 to the correct master device. During the transfer, the slave device 12 issues an OKAY response on buses 29 and 30 notifying the arbiter and master device that the transfer has successfully occurred.

In some cases, the master device 10 may assert an HLOCK signal on bus 40 to indicate to arbiter 14 that the master device is performing several indivisible transfers and that the arbiter must not grant any other master device access to the bus once the locked transfer commences. The arbiter indicates that a current transfer is part of a locked sequence by asserting an HMASTLOCK signal on bus 42 to slave device 12. The slave device responds to the signal on bus 42 to process all locked transfers before any other master device is granted access to the bus.

Figure 2:
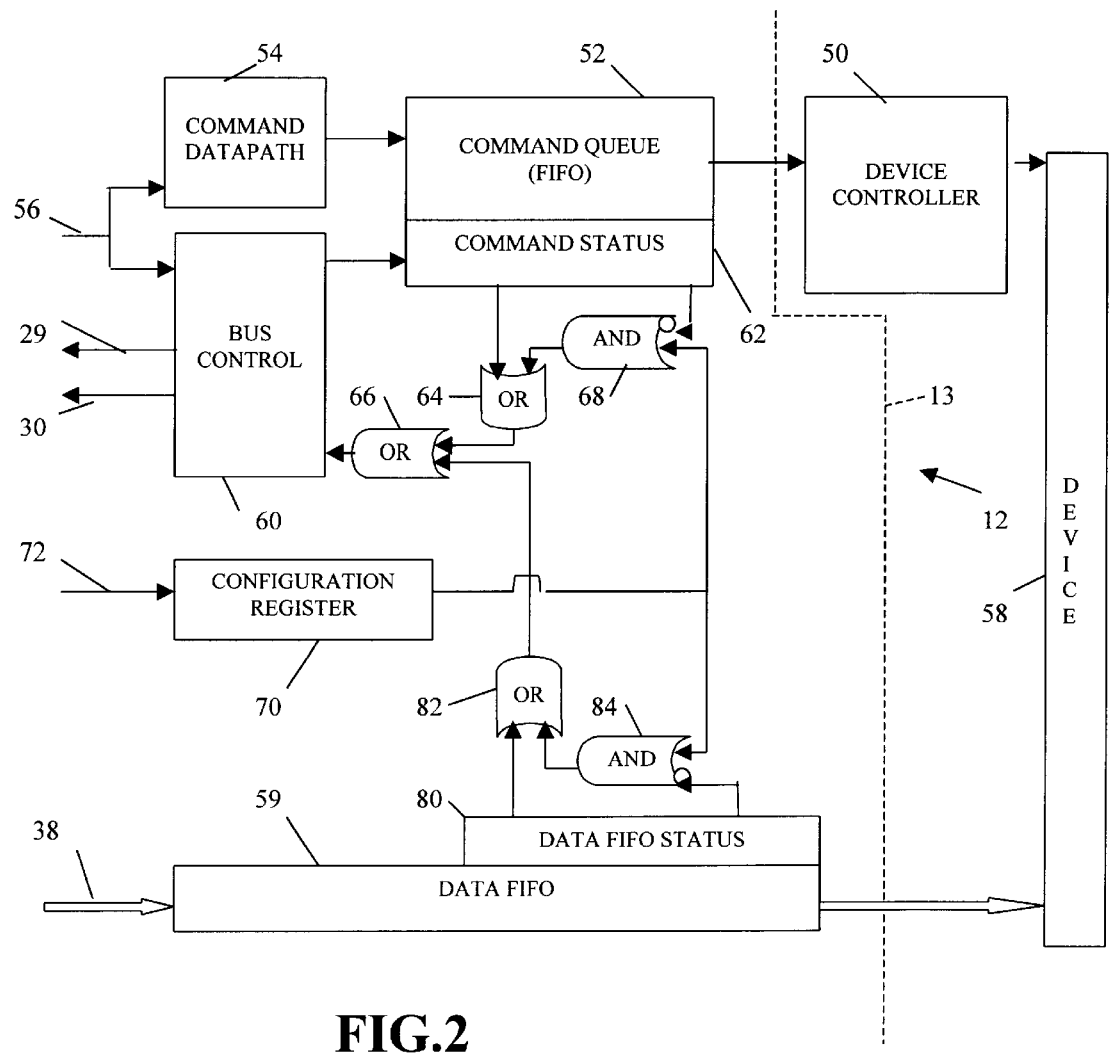
FIG. 2 is a functional block diagram of a command input portion of a slave device for the bus illustrated in FIG. 1.

The present invention is directed to a debug mode that slows operation of the slave unit so that a transaction on the bus can be easily traced for maintenance and debug purposes. FIG. 2 is a functional block diagram of the input portion of a slave device 12 in accordance with the present invention. Slave device 12 feeds device controller 50 that receives commands from command queue 52. Device controller 50 responds to the commands to execute operations on peripheral device 58, such as an external memory. Device 58 is coupled through write data FIFO 59 to receive data from the master device 10 via data bus 38.

Command queue 52 is a first-in, first-out (FIFO) register that receives commands from command datapath 54 through bus 56, which includes lines 20, 22, 23, 24, 26 and 42 (FIG. 1) carrying the HADDR address, HMASTER master ID, lock signals (HMASTLOCK), transfer type and size (HTRANS and HSIZE) and whether the transaction is a read or write (HWRITE). Bus control 60 responds to the commands from bus 56 to enable writing new commands into command queue 52.

Command status counter 62 is coupled to command queue 52 to maintain a count of the number of commands in FIFO 52. As each new command is written into FIFO 52, the count in counter 62 is incremented; as device controller 50 pulls commands from FIFO 52, the count in counter 62 is decremented. If counter 62 contains a count indicative that FIFO 52 is full, and cannot accept additional commands, counter 62 supplies a COMMAND_STATUS_FULL signal to OR gate 64, which in turn supplies a COMMAND_QUEUE_FULL signal to OR gate 66.

Data FIFO status counter 80 is coupled to data FIFO 59 to maintain a count of data in FIFO 59. As each beat of data is written into FIFO 59, the count in counter 80 is incremented; as beats of data are supplied to device 58, the count in counter 80 is decremented. If counter 80 contains a count indicative that data FIFO 59 is full, and cannot accept additional data, counter 80 supplies a DATA_FIFO_STATUS_FULL signal to OR gate 82, which in turn supplies a DATA_FIFO_FULL signal to OR gate 66.

OR gate 66 is responsive to either the COMMAND_QUEUE_FULL signal from OR gate 64 or the DATA_FIFO_FULL signal from OR gate 82 to supply a QUEUE_FULL signal to bus control 60. Bus control 60 is responsive to the QUEUE_FULL signal and to commands at 56 to issue a split or a stall signal on lines 29 and 30. More particularly, with QUEUE_FULL signal high, a new command for a non-locked sequence will cause bus control to issue a split signal on lines 29 and 30, whereas a new command for a locked sequence will cause bus control 60 to issue a stall signal on lines 29 and 30. As a result, either the requesting master device is masked from the bus and the data bus is idled in accordance with the split procedure described above, or the bus is stalled in accordance with the stall procedure.

In accordance with the present invention, configuration register 70 receives a maintenance or debug signal via line 72. In one form of the invention, configuration register 70 is a bistable multivibrator (flip-flop) that is set by a high signal on line 72, and is re-set by a low signal on line 72. The set condition of register 60 forces a high DEBUG bit to a first input of AND gates 68 and 84.

Counter 62 supplies a COMMAND_STATUS_EMPTY signal to the inverted input of gate 68. Counter 62 is responsive to the absence of commands in FIFO 52 to provide a high COMMAND_STATUS_EMPTY signal to AND gate 68. Hence, gate 68 provides a high output bit when the DEBUG signal is high and FIFO 52 is not empty. (It will be appreciated that counter 62 may supply a signal representing a not-empty status of FIFO 52, in which case the input to gate 68 from counter 62 would not be inverted.) In either case, the status signal to gate 68 reflects whether or not FIFO 52 is empty, and gate 68 supplies a logical high when FIFO 52 is not empty and DEBUG is logically high. Gate 68 provides an output to OR gate 64, which in turn supplies a COMMAND_QUEUE_FULL signal to OR gate 66.

In a similar manner, counter 80 supplies a DATA_FIFO_STATUS_EMPTY signal to the inverted input of AND gate 84. Counter 80 is responsive to the absence of data in FIFO 59 to provide a high DATA_FIFO_STATUS_EMPTY signal to AND gate 84. Hence, gate 84 provides a high output bit when the DEBUG signal is high and FIFO 59 is not empty. (Again, it will be appreciated that counter 80 may supply a signal representing a not-empty status of FIFO 59, in which case the input to gate 84 from counter 59 would not be inverted.) In either case, the status signal to gate 84 reflects whether or not FIFO 59 is empty, and gate 84 supplies a logical high when FIFO 59 is not empty and DEBUG is logically high. Gate 84 provides an output to OR gate 82, which in turn supplies a DATA_FIFO_FULL signal to OR gate 66. OR gate 66 supplies the QUEUE_FULL signal to bus control 60 in response to either the DATA_FIFO_FULL from gate 82 or the COMMAND_QUEUE_FULL signal from gate 64.

Gate 66 supplies the QUEUE_FULL signal to bus control 60 when either (1) the COMMAND_STATUS_FULL signal is high, or (2) the DATA_FIFO_STATUS_FULL signal is high, or (3) the DEBUG signal is high and FIFO 52 is not empty, or (4) the DEBUG signal is high and FIFO 59 is not empty. Logically,

```
QUEUE_FULL = COMMAND_STATUS_FULL
    OR DATA_FIFO_STATUS_FULL
    OR (DEBUG ANDNOT COMMAND_STATUS_EMPTY)
    OR (DEBUG ANDNOT DATA_FIFO_STATUS_EMPTY).
```

Counter 62 serves as a register supplying the COMMAND_STATUS_FULL and COMMAND_STATUS_EMPTY bits and counter 80 serves as a register supplying the DATA_FIFO_STATUS_FULL and DATA_FIFO_STATUS_EMPTY bits.

To perform a maintenance operation, a maintenance or debug signal on line 72 operates configuration register 70 to assert a DEBUG bit to gates 68 and 84. If FIFO 52 is not empty, gate 68 operates OR gates 64 and 66 to supply a QUEUE_FULL signal to bus control 60. Likewise, if FIFO 59 is not empty, gate 84 operates OR gates 82 and 66 to supply a QUEUE_FULL signal to bus control 60. In either case, bus control 60 splits the next requesting master device (if the next command is for a non-locked sequence) or stalls the bus (if the nest command is for a locked sequence).

Eventually, the commands in FIFO 52 will be fed to the device controller and the data in FIFO 59 will be fed to the device, and FIFOs 52 and 59 will become empty. When this occurs, only one command will be accepted by the slave device at a time for execution by the device controller. Until that command is pulled from FIFO 52 by the device controller, any further commands received by the slave device will either be split or will stall the bus due to the high DEBUG bit and low COMMAND_STATUS_EMPTY bit. Additionally, only one beat of data will be accepted by FIFO 59. Consequently, FIFOs 52 and 59 are effectively slowed to the pace of the device controller so that only one entry appears in FIFO 52 and only one beat of data appears in FIFO 59 at a given time. The transaction is easily traced because the next event out of FIFOs 52 and 59 can only be the result of the command previously written into the FIFOs.

With the DEBUG signal asserted and FIFOs 52 and 59 empty, maintenance commands can be transferred to the slave device, one at a time, and reaction of the slave device, arbiter and the master device initiating the maintenance command may be analyzed. Hence, the analysis may be performed on the commands one at a time, at a pace assuring that a single command and its associated maintenance data are processed through the system for each maintenance cycle. Moreover, the entire data bus may be analyzed for the one slave device, without affecting normal operation of the data bus between the master devices and the other slave devices.

When configuration register 70 is cleared and the DEBUG signal is de-asserted, slave device 12 reverts to its normal operation. Any split transactions are re-arbitrated by arbiter 14 in the normal manner.

Configuration register 70 may be set and cleared independently of the arbiter operation via a separate bus 72, for example from a separate configuration control. This feature allows maintenance of the system including the slave device independently from all other devices in the system and in a manner that is transparent to all other components of the system, other than the components being tested and the component that resets it.

The present invention thus provides an effective maintenance tool that permits testing of the entire system of a slave device without affecting other slave devices. Performance of the system can be analyzed slowly since the processing of one maintenance command at a time effectively slows operation of the slave unit so that a transaction on the bus can be easily traced for maintenance and debug purposes.

One feature of the present invention as applied to the AHB bus architecture is that it employs existing commands and controls of the AHB bus. Consequently, existing commands and controls do not need to be changed to accommodate the present invention. Instead, the inclusion of the configuration register and gates 64, 66, 68, 82 and 84 permit use of the existing controls to force operation of FIFOs 52 and 59 at a pace no faster than that of device controller 50.

While the present invention is described in conjunction with a command FIFO operating a device controller for the peripheral device, in some environments the command FIFO, and its associated counter, might be omitted, in which case the command path directly feeds a FIFO in the device controller. In such cases, the COMMAND_STATUS_FULL bit and COMMAND_STATUS_EMPTY bit are issued by the device controller based on the queue of commands in the device controller.

Although the present invention has been described with reference to preferred embodiments, workers skilled in the art will recognize that changes may be made in form and detail without departing from the spirit and scope of the invention.

What is claimed is:

1. A slave device for transferring data via a data bus with respective ones of a plurality of master devices wherein data are transferred based on a command from a master device, the slave device receiving commands in a queue for execution on a first-in, first-out basis by a device fed by the slave device, the queue providing a first status signal representing a full condition of the queue, the slave device comprising:

a status register responsive to the queue to provide a second status signal when the command queue is not empty; and a bus control responsive to the first status signal to operate the bus in a predetermined mode and responsive to the second status signal and a control signal to operate the bus in the predetermined mode.

2. The apparatus of claim 1, further including:

a configuration register providing the control signal identifying a maintenance status of the slave device, and a logic gate responsive to the second status signal and the control signal to provide a queue full signal, the bus control being responsive to the queue full signal to operate the bus in the predetermined mode.

3. The apparatus of claim 2, wherein the logic gate is further responsive to the first status signal to provide the queue full signal.

4. The apparatus of claim 2, wherein the logic gate includes:
   an anding gate coupled to the configuration register and the status register for anding the second status and control signals, and
   an or gate coupled to the status register and anding gate for oring the first status signal and output of the anding gate to provide the queue full signal.

5. The apparatus of claim 1, wherein the slave device includes a command queue for receiving commands on a first-in, first-out basis for execution by a peripheral device fed by the slave device and a data queue for receiving data on a first-in, first-out basis for transfer to the peripheral device, wherein the first status signal is supplied by the command queue and the first-mentioned status register is responsive to the command queue to provide the second status signal.

6. The apparatus of claim 5, wherein the slave device further comprises:
   a second status register responsive to the data queue to provide a third status signal when the data queue is not empty, the bus control being further responsive to the third status signal and the control signal to operate the bus in the predetermined mode.

7. The apparatus of claim 6, further including:
   a configuration register providing the control signal identifying a maintenance status of the slave device, and
   a first logic gate responsive to the second status signal and the control signal to provide a first queue full signal,
   a second logic gate responsive to the third status signal and the control signal to provide a second queue full signal, and
   a third logic gate responsive to either of the second and third queue full signals to operate the bus in the predetermined mode.

8. The apparatus of claim 7, wherein the data queue provides a fourth status signal representing a full condition of the data queue and the first logic gate is further responsive to the first status signal to provide the first queue full signal and the second logic gate is further responsive to the fourth status signal to provide the second queue full signal.

9. The apparatus of claim 7, wherein the first logic gate includes:
   a first anding gate coupled to the configuration register and the first status register for anding the second status and control signals, and
   a first or gate coupled to the first status register and first anding gate for oring the first status signal and output of the first anding gate to provide the first queue full signal, and
the second logic gate includes:
   a second anding gate coupled to the configuration register and the second status register for anding the third status and control signals, and
   a second or gate coupled to the second status register and second anding gate for oring the second status signal and output of the second anding gate to provide the second queue full signal, and
the apparatus further including:
   a third oring gate coupled to the first and second oring gates to operate the bus control.

10. The apparatus of claim 1, wherein the bus control operates the bus to the predetermined mode selected from the group consisting of splits and stalls based on a type of command.

11. A process of operating a slave device in a maintenance mode, where the slave device is coupled to a data bus and responsive to commands from master devices to transfer data between a respective master device and the slave device, wherein data or commands are received in a queue for execution on a first-in, first-out basis by a device fed by the slave device, and the slave device includes
   a status register responsive to the queue to provide a first status signal when the queue is full and a second status signal when the queue is not empty, and
   a bus control responsive to a queue full signal to operate the bus to a predetermined mode, the slave device providing the queue full signal in response to the first status signal, the process comprising steps of:
      a) receiving a control signal at the slave device; and
      b) providing the queue full signal in response to both the second status signal and the control signal.

12. The process of claim 11, wherein the predetermined mode is selected from the group consisting of splits and stalls, and step (b) comprises steps of:
   b1) operating the bus in the split mode in response to the queue full signal if the command is a first type, or
   b2) operating the bus in the stall mode in response to the queue full signal if the command is a second type.

13. The process of claim 12, further including a step of:
   c) analyzing a transaction executed in response to a command.

14. The process of claim 11, further including a step of:
   c) analyzing a transaction executed in response to a command.

15. The process of claim 11, wherein the slave device includes a command queue and a data queue, and wherein a status register is associated with each of the queues to supply the first status signal when the respective queue is full and the second status signal when the respective queue is not empty, and wherein step (b) provides the queue full signal in response to the control signal and either of the second status signals.

16. In a data bus for transferring data between a slave device and respective ones of a plurality of master devices, wherein the slave device includes a data queue for transferring data between the slave device and the respective master device on a first-in first-out basis, a command queue that stores commands from master devices for execution by a device fed by the slave device on a first-in, first-out basis, a status register that indicates whether at least one of the queues is full and whether the at least one queue is empty, a process comprising steps of:
   a) receiving a debug signal at the slave device; and
   b) indicating that the at least one queue is full in response to the debug signal when the at least one queue is not empty.

17. The process of claim 16, wherein a bus control operates the data bus in a predetermined mode when the at least one queue is full, and the process further comprises:

c) controlling the bus control to operate the data bus in the predetermined mode in response to the debug signal when the at least one queue is not empty.

18. The process of claim 17, wherein, in response to a command of a first type, step (c) comprises steps of:
   c1) idling the data bus, and
   c2) denying the requesting master device access to the data bus.

19. The process of claim 17, wherein, in response to a command of a second type, step (c) includes a step of:
   c1) stalling the data bus.

20. The process of claim 16, further including a step of:
   d) analyzing a transaction executed in response to a command.

* * * * *